(12) United States Patent
Lecuyer et al.

(10) Patent No.: US 10,468,670 B2
(45) Date of Patent: Nov. 5, 2019

(54) LITHIUM-SULFUR BATTERY

(71) Applicants: BLUE SOLUTIONS, Ergue-gaberic (FR); CENTRE NATIONAL DE LA RECHERCHE SCIENTIFIQUE, Paris (FR); UNIVERSITE DE NANTES, Nantes (FR)

(72) Inventors: Margaud Lecuyer, Combrit (FR); Marc Deschamps, Quimper (FR); Joël Gaubicher, Nantes (FR); Bernard Lestriez, Nantes (FR); Dominique Guyomard, Sautron (FR)

(73) Assignees: BLUE SOLUTIONS, Ergue Gaberic (FR); UNIVERSITE DE NANTES, Nantes (FR); CENTRE NATIONAL DE LA RECHERCHE SCIENTIFIQUE, Paris (FR)

( * ) Notice: Subject to any disclaimer, the term of this patent is extended or adjusted under 35 U.S.C. 154(b) by 0 days.

(21) Appl. No.: 15/125,457

(22) PCT Filed: Mar. 9, 2015

(86) PCT No.: PCT/FR2015/050568
§ 371 (c)(1),
(2) Date: Sep. 12, 2016

(87) PCT Pub. No.: WO2015/136197
PCT Pub. Date: Sep. 17, 2015

(65) Prior Publication Data
US 2018/0175375 A1     Jun. 21, 2018

(30) Foreign Application Priority Data
Mar. 13, 2014 (FR) ..................... 14 52087

(51) Int. Cl.
*H01M 4/36* (2006.01)
*H01M 4/62* (2006.01)
(Continued)

(52) U.S. Cl.
CPC ............ *H01M 4/364* (2013.01); *C01B 17/00* (2013.01); *C01B 17/0248* (2013.01);
(Continued)

(58) Field of Classification Search
None
See application file for complete search history.

(56) References Cited

U.S. PATENT DOCUMENTS 7,553,590 B2    6/2009  Mikhaylik
2003/0113624 A1 6/2003  Kim et al.
(Continued)

FOREIGN PATENT DOCUMENTS

CN    101567437    * 10/2009
CN    102447113      5/2012

OTHER PUBLICATIONS

CN101567437 English translation. Oct. 2009. Sun et al. (Year: 2009).*
Search Report dated Dec. 10, 2014.

*Primary Examiner* — Christopher P Domone
(74) *Attorney, Agent, or Firm* — IPSILON USA, LLP

(57) ABSTRACT

The present invention concerns a positive electrode including a composite material including sulfur and carbon as an active material and its method of manufacture, a lithium-sulfur battery including such a positive electrode and its method of manufacture.

20 Claims, 4 Drawing Sheets

(51) Int. Cl.
    *H01M 4/1397*     (2010.01)
    *H01M 10/0565*     (2010.01)
    *H01M 10/052*     (2010.01)
    *C01B 17/02*     (2006.01)
    *C01B 17/00*     (2006.01)
    *H01M 4/136*     (2010.01)
    *H01M 4/58*     (2010.01)
    *H01M 4/02*     (2006.01)

(52) U.S. Cl.
    CPC ......... *H01M 4/136* (2013.01); *H01M 4/1397* (2013.01); *H01M 4/58* (2013.01); *H01M 4/622* (2013.01); *H01M 4/625* (2013.01); *H01M 10/052* (2013.01); *H01M 10/0565* (2013.01); *H01M 2004/027* (2013.01); *H01M 2004/028* (2013.01); *H01M 2300/0085* (2013.01)

(56) References Cited

U.S. PATENT DOCUMENTS

2004/0048154 A1*   3/2004   Jung ..................... H01M 4/136
                                                    429/212
2015/0246816 A1*   9/2015   Liu ......................... H01M 4/13
                                                    216/39

* cited by examiner

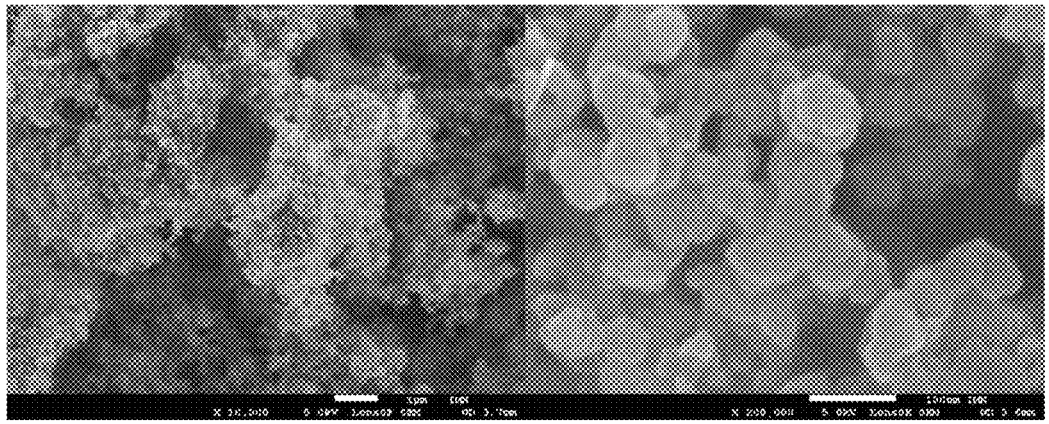
Figure 3a                    Figure 3b
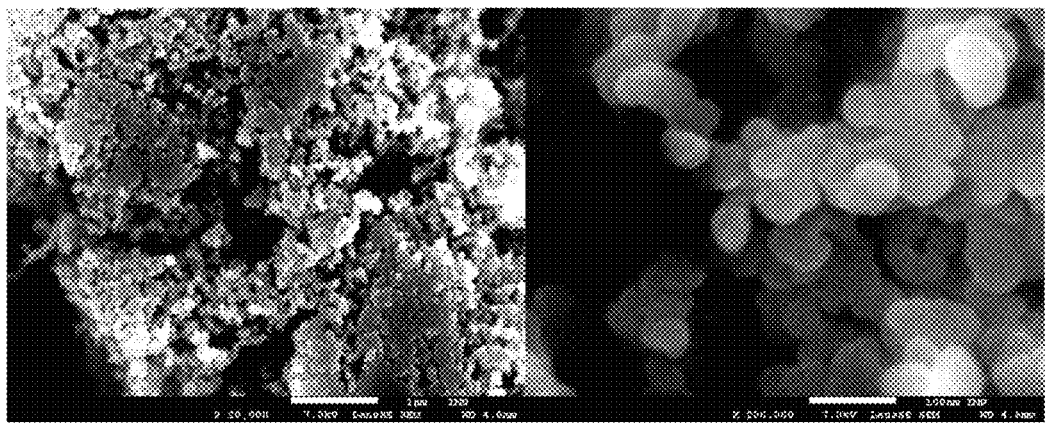
Figure 4a                    Figure 4b

LITHIUM-SULFUR BATTERY

RELATED APPLICATIONS

This application is a National Phase Application of PCT/FR2015/050568 filed on Mar. 9, 2015, which in turn claims the benefit of French Patent Application No. 14 52087, filed on Mar. 13, 2014 the entirety of which are incorporated herein by reference.

BACKGROUND

Field of the Invention

The present invention relates to the field of high energy and power density lithium-sulfur batteries. In particular, the present invention concerns a positive electrode including a composite material including sulfur and carbon as an active material and its method of manufacture, a lithium-sulfur battery including such a positive electrode and its method of manufacture.

Description of Related Art

Lithium batteries have become indispensable components in many devices that include portable apparatuses, such as notably mobile phones, computers and light equipment, or heavier equipment such as two-wheeled (bicycles, mopeds) or four-wheeled (electric or hybrid motor vehicles) means of transport. They are also extensively studied for use in the field of stationary energy storage.

A lithium battery includes at least one negative electrode and at least one positive electrode between which is placed a solid electrolyte or a separator impregnated with a liquid electrolyte. The liquid electrolyte consists, for example, of a lithium salt in solution in a solvent selected for optimizing the transportation and dissociation of ions. The positive electrode consists of a current collector supporting an electrode material containing at least one positive electrode active material capable of reversibly inserting lithium ions; the negative electrode consists of a metallic lithium foil (possibly supported by a current collector), a lithium alloy or an intermetallic lithium compound (lithium battery), or a current collector supporting an electrode material containing at least one negative electrode active material capable of reversibly inserting lithium ions (lithium-ion battery: Li-ion). Each electrode material generally further includes a polymer that acts as a binder (e.g. polyvinylidene fluoride or PVDF) and/or an agent imparting electronic conductivity (e.g. carbon).

In the course of battery operation, lithium ions pass from one electrode to the other through the electrolyte. During battery discharge, a quantity of lithium reacts with the positive electrode active material from the electrolyte and an equivalent quantity is introduced into the electrolyte from the negative electrode active material, the lithium concentration thus remaining constant in the electrolyte. The insertion of lithium into the positive electrode is offset by the addition of electrons from the negative electrode via an external circuit. During charging, the reverse phenomena take place.

The various components of a lithium battery are selected so as to produce, at the least possible cost, batteries that have a high energy density, a good resistance to cycling and that operate safely.

One of the most promising electrochemical energy storage systems is the lithium-sulfur battery, first, because elemental sulfur $S_8$ is an inexpensive element and, secondly, because such a battery may theoretically reach a high specific capacity and mass energy density respectively of 1 675 mAh/$g_{sulfur}$, and 2 600 Wh/$kg_{sulfur}$, if the elemental sulfur $S_8$ is completely reduced into lithium sulfide $Li_2S$ at a voltage close to 2 volts (in relation to the $Li^+/Li^0$ pair). By comparison, the mass energy densities obtained currently are 200-250 Wh/kg for the best Li-ion batteries, 100-150 Wh/kg for a Na-ion battery, 500 Wh/kg for a lithium-air battery and 50 Wh/kg for a redox-flow battery.

Such a lithium-sulfur battery generally includes a metallic negative electrode (i.e. anode) composed of lithium or a lithium-based alloy, a positive electrode (i.e. cathode) including sulfur or an organic compound including sulfur as an active material, and an electrolyte including a lithium salt.

Sulfur and organic compounds including sulfur, however, have the disadvantage of being electrically and ionically insulating (e.g. electronic conductivity of sulfur $S_8=5\times10^{-30}$ $S \cdot cm^{-1}$ at 25° C.). In order to enable a reversible electrochemical reaction at high current regimes, the sulfur must therefore be in intimate contact with an electrically conductive additive such as carbon.

Thus Lécuyer et al. [*Journal of Power Sources*, 2013, 241, 249] have described a method for preparing a positive electrode including sulfur and carbon, said method including a step of mixing at 80° C. a carbon black) (Ketjenblack®), a lithium salt ($LiClO_4 \cdot 3H_2O$), a copolymer of polyethylene oxide (PEO), optionally PVDF, and sulfur in water or propylene carbonate in order to obtain an electrode paste; then a step of laminating said electrode paste at 95° C. on an aluminum current-collector covered with a carbon-based layer, for obtaining a positive electrode in film form; and finally a step of drying said electrode at 105° C. in order to evaporate the remaining water. Lécuyer et al. also describe a lithium-sulfur battery including said positive electrode, a lithium foil as a negative electrode and a PEO-based solid polymer electrolyte. However, the tests performed with said battery show that in the course of discharge, the sulfur is converted into long-chain polysulfides which are soluble and, accordingly, diffuse into the polymer electrolyte. This diffusion leads to significant changes in the volume of the polymer electrolyte which swells and the positive electrode which loses its initial morphology. This leads to the collapse of said positive electrode after a few cycles and poor cyclability of the battery.

Zhao et al. [*Solid State Ionics*, 2012, 234, 40] have described a pretreatment of the carbon and sulfur mixture before preparing the positive electrode in order to improve its electronic conductivity and to prevent the dissolution of polysulfides in the electrolyte. This pretreatment includes a step of mixing a mesoporous carbon black with sulfur in tetrahydrofuran, then a step of ball-milling the mixture of the preceding step, then a step of vacuum drying at 60° C. for 6 hours in order to evaporate the tetrahydrofuran, then a first step of heat treatment under argon at 150° C. for 5 hours in order to enable the incorporation of the molten sulfur in the pores of the carbon black, and finally a second step of heat treatment under argon at 300° C. for 3 hours in order to evaporate the remaining sulfur and to form a sulfur/carbon composite as an active electrode material. This pretreatment, however, has the drawbacks, first, of not being able to be used at the industrial stage since it comprises many steps and uses sophisticated and relatively expensive equipment and, secondly, not allowing the introduction of a large quantity of sulfur in the sulfur/carbon composite formed. Indeed, the high temperatures used during the second heat treatment promote the incorporation of sulfur (in the vapor phase) in the micropores of the carbon black and all the sulfur that was on the surface of the mesopores at the end of the first heat treatment evaporates. Furthermore, the two heat treatments are performed in a tubular furnace under argon, i.e. in an unenclosed environment, thereby promoting the vaporization of the sulfur. Moreover, the cathode obtained from said sulfur/carbon composite only includes 43% by mass of sulfur in relation to the total mass of the electrode. However, during the assembly of the battery, the electrolyte "fills" said electrode, inducing a reduction in the mass proportion of sulfur in the electrode thus filled before cycling. But, it is necessary to introduce and retain a large quantity of sulfur in the positive electrode for achieving a high energy density of the battery.

OBJECTS AND SUMMARY

The aim of the present invention is to overcome the drawbacks of the aforementioned prior art and to provide a positive electrode including, as an active material, a composite material including sulfur and carbon in which the sulfur is present in large quantity and is homogeneously dispersed, said positive electrode being economical to prepare and making it possible to improve the electrochemical performance of a lithium-sulfur battery. In addition, another aim of the present invention is to develop an economical battery in which the diffusion of polysulfides in the electrolyte as well as the collapse of the positive electrode are avoided, thereby ensuring better cyclability.

These aims are achieved by the invention which will be described below.

The first subject matter of the invention is a positive electrode characterized in that it includes:
- at least one composite material including sulfur (S) and carbon (C), as an active electrode material,
- at least one polymer binder $P_1$,
- at least one low-molar-mass liquid linear polyether, and
- at least one lithium salt $L_1$, in that sulfur (S) represents at least about 40% by mass, preferably at least about 45% by mass, and more preferably at least about 50% by mass, in relation to the total mass of said positive electrode, and in that the composite material including sulfur (S) and carbon (C) is obtained according to the following steps:
i) a step of mixing an essentially mesoporous carbon agent and a sulfur agent selected from elemental sulfur $S_8$ and an organic sulfur compound including at least one S–S bond, the quantity of sulfur (S) in said mixture ranging from about 75% to 85% by mass,
ii) a step of milling the mixture obtained in the preceding step i),
iii) a step of heat treatment of the milled mixture obtained in the preceding step ii) in a closed container, at a temperature sufficient to melt the sulfur,
iv) a step of milling the heat-treated mixture from the preceding step iii),
said carbon agent used in step i) exhibiting the following characteristics:
- a specific surface area $S_{BET}$ greater than or equal to about 700 m$^2$/g, and preferably greater than or equal to about 800 m$^2$/g, said specific surface being calculated by the BET method (i.e. the Brunauer, Emmett and Teller method, 1938),
- an average mesopore size between about 4 and 10 nm, said size being calculated by the BJH method (i.e. the Barrett, Joyner and Halenda method, 1951),
- a total pore volume greater than or equal to about 1 cm$^3$/g, and preferably greater than or equal to about 1.5 cm$^3$/g, said total pore volume being calculated by the BET method.

In the present invention, the expression "essentially mesoporous carbon agent" means that the carbon agent includes a mesopore volume representing at least about 70% by volume of the total pore volume, preferably at least about 80% by volume of the total pore volume, and more preferably at least about 90% by volume of the total pore volume, said mesopore volume being calculated from the BJH method.

In the present invention, the expression "carbon agent" means an agent essentially including carbon, i.e. including at least about 80% by mass of carbon, preferably at least about 90% by mass of carbon, and more preferably at least about 95% by mass of carbon.

In the following description and unless explicitly stated otherwise, all the specific surface area values referred to were calculated by the BET method. Similarly, all the mesopore size values referred to were calculated by the BJH method. Finally, all the total pore volume values were determined by the BET method and all the mesopore volume values were calculated by the BJH method.

The carbon agent is preferably carbon black.

As an example of carbon black exhibiting the previously defined characteristics, carbon blacks may be cited marketed under the references: Ketjenblack 600JD®, Ketjenblack 700JD® and Timcal Ensaco 350G®.

The specific surface area of the carbon agent is preferably greater than or equal to about 1 000 m$^2$/g, and more preferably greater than or equal to about 1 400 m$^2$/g.

According to a preferred embodiment of the invention, the total pore volume of the carbon agent is greater than or equal to about 2 cm$^3$/g, and preferably greater than or equal to about 2.5 cm$^3$/g.

Preferably, the carbon agent particles are in the form of spherical particles (i.e. in the form of beads) in order to promote conduction notably in the direction perpendicular to the positive electrode (i.e. in the direction of its thickness) and so facilitate the electrochemical exchanges between the positive electrode and the negative electrode. Indeed, the carbon agent particles in the form of spherical particles have a propensity to form three-dimensional conductive networks. When the carbon agent particles are in the form of spherical particles, this means that multiple carbon atoms form spheres.

Thus, in order to promote conduction in the transverse direction of the positive electrode (i.e. in the direction of its thickness), the carbon agent is preferably not in the form of fibers or platelets such as carbon fibers or graphene platelets, since they will be preferentially oriented in the direction of manufacture of the film.

In a particularly preferred embodiment of the invention, the carbon agent includes spherical carbon particles having an average diameter ranging from about 20 nm to 100 nm. Thus, each sphere including multiple carbon atoms exhibits an average diameter ranging from about 20 nm to 100 nm.

According to a preferred embodiment, the quantity of sulfur (S) in the mixture of step i) ranges from about 80% to 85% by mass.

The particle size of the sulfur agent used in step i) is not critical. Thus, any size of particles of sulfur agent may be used.

The organic sulfur compound may be selected from organic polysulfides, notably those with the general formula $R^1$—S—$S_n$—$R^2$ in which $R^1$ and $R^2$, identical or different, represent a linear, substituted, or cyclic alkyl chain, which may include from 1 to 20 carbon atoms, and n being between 1 and 50; and the disulfide polymers exhibiting a sequence of S—S bonds that may be broken during the discharge cycle of a lithium-sulfur battery and reformed during the charging cycle.

Step ii) of milling facilitates the homogeneous distribution of the sulfur on the carbon. It may be performed manually, notably with the aid of a mortar, or mechanically, notably with the aid of a ball mill.

The temperature sufficient for step iii) is advantageously selected such that the sulfur is in the liquid state and that the viscosity of the molten sulfur is low.

The temperature sufficient for the heat treatment of step iii) may range from about 115° C. to 270° C., preferably from about 130° C. to 220° C., and more preferably from about 140° C. to 170° C.

The duration of the heat treatment of step iii) may range from about 30 minutes to 24 hours, and preferably from about 1 to 5 hours.

Step iii) is preferably performed in a dry air atmosphere, notably exhibiting a dew point less than or equal to about −30° C.

The inventors of the present patent application have thus discovered that when the carbon agent exhibits a particular mesopore size ranging from 4 to 10 nm, the sulfur is capable, during step iii), of filling the porosity of the carbon agent. Indeed, the pore size of the carbon agent must be sufficiently large (i.e. greater than 4 nm) to enable the molten sulfur to penetrate inside the pores, but sufficiently small (i.e. less than 10 nm) to exert sufficient retention of the polysulfides during cycling.

In addition, the high specific surface area ($S_{BET} \geq 700$ m²/g) of the carbon agent enables a thin layer of sulfur to be obtained over the whole skeleton formed by the carbon agent and prevents the formation of agglomerates of sulfur in the composite material and, accordingly, the rapid diffusion of the sulfur during cycling. The large pore volume is also necessary for effectively retaining the polysulfides formed during cycling.

Finally, the composite material of the positive electrode of the invention has a homogeneously distributed fine coating of sulfur, thus increasing its accessibility during electrochemical reactions and its mechanical stability.

Step iv) may be performed manually, notably with the aid of a mortar, or mechanically, notably with the aid of a ball mill.

Thus, at the end of step iv), the composite material including sulfur and carbon is structured so that the sulfur forms a surface coating of carbon agent by entering the mesopores thereof.

The process may further include between step iii) and step iv), a step of cooling the closed container including the milled mixture.

According to a preferred embodiment, the method for obtaining the composite material does not include heat treatment step(s) other than step iii).

The method leading to the composite material of the positive electrode of the invention is simple, fast and does not require any complex device. Thanks to this method, the coating of the carbon agent by sulfur is facilitated with a low cost of production.

In the present invention, "a low-molar-mass linear polyether" means a linear polyether with a molar mass of less than or equal to about 20 000 g·mol⁻¹, preferably less than or equal to about 2 000 g·mol⁻¹, and more preferably less than or equal to about 600 g·mol⁻¹.

In the present invention, "a low-molar-mass liquid linear polyether" is also called "polyether".

It should be noted that the total mass of the positive electrode includes the mass of the composite material, the mass of the polymer binder $P_1$, the mass of the polyether and the mass of the lithium salt $L_1$.

The positive electrode may include about 2 to 20% by mass of polyether, preferably about 8 to 18% by mass of polyether, in relation to the total mass of the positive electrode.

The polyether may be selected from:
polyethylene glycols with the formula H—[O—CH₂—CH₂]$_m$—OH in which m is between 1 and 13,
glycol ethers with the formula R—[O—CH₂—CH₂]$_q$—O—R' in which p is between 1 and 13, and R and R', identical or different, are linear, substituted or cyclic alkyl groups, which may include from 1 to 20 carbon atoms,
ethers with the formula R¹—[CH₂—O]$_q$—R¹' in which q is between 1 and 13, and R¹ and R¹', identical or different, are linear, substituted or cyclic alkyls, which may include from 1 to 20 carbon atoms and optionally heteroatoms,
cyclic ethers, cyclic polyethers, and
one of the mixtures thereof.

The polyether(s) used in the positive electrode of the invention are particularly stable vis-a-vis lithium and sulfur compounds, thereby minimizing side reactions.

In a preferred embodiment, the polyether is tetraethylene glycol dimethyl ether (TEGDME) with the formula CH₃O—(CH₂—CH₂)₄—OCH₃ (i.e. R, R'=CH₃ and p=4).

According to a particular embodiment, the positive electrode includes about 5 to 20% by mass of polymer binder $P_1$, and preferably about 5 to 15% by mass of polymer binder $P_1$, in relation to the total mass of the positive electrode.

The polymer binder $P_1$ may be selected from copolymers of ethylene and propylene, or a mixture of at least two of these polymers; homopolymers and copolymers of ethylene oxide (e.g. PEO, copolymer of PEO), methylene oxide, propylene oxide, epichlorohydrin or allyl glycidyl ether, or mixtures thereof; halogenated polymers such as homopolymers and copolymers of vinyl chloride, vinylidene fluoride (PVDF), vinylidene chloride, ethylene tetrafluoride, or chlorotrifluoroethylene, copolymers of vinylidene fluoride and hexafluoropropylene (PVDF-HFP) or mixtures thereof; polyacrylates such as polymethyl methacrylate; polyalcohols such as polyvinyl alcohol, electronically conductive polymers such as polyaniline, polypyrrole, polyfluorenes, polypyrenes, polyazulenes, polynaphthalenes, polyacetylenes, poly(p-phenylene-vinylene), polycarbazoles, polyindoles, polyazepines, polythiophenes, poly(p-phenylene sulfide) or mixtures thereof; cationic polymers such as polyethyleneimine (PEI), polyaniline in the form of emeraldine salt (ES), poly(N-quaternized vinylimidazole) or mixtures thereof; and one of the mixtures thereof.

A cationic (i.e. positively charged) polymer improves the retention of polysulfides which are negatively charged in the positive electrode and thus limits the diffusion of polysulfides in the electrolyte during cycling.

The polymer binder $P_1$ is preferably PEI or ES.

According to a preferred embodiment of the invention, the positive electrode only includes PEI or ES as a polymer binder $P_1$.

In a particular embodiment, the positive electrode defined in the first subject matter of the invention does not include an agent imparting electronic conductivity other than the carbon agent of the composite material.

Indeed, the presence of the carbon agent in the composite material may suffice to impart to the positive electrode of the invention sufficient electronic conductivity to enable correct operation of the battery.

The positive electrode may include about 2 to 25% by mass of lithium salt $L_1$, preferably about 3 to 15% by mass of lithium salt $L_1$, and more preferably about 3 to 8% by mass of lithium salt $L_1$, in relation to the total mass of the positive electrode.

The lithium salt $L_1$ may be selected from lithium fluorate ($LiFO_3$), lithium bis(trifluoromethanesulfonyl) imide (LiTFSI), lithium hexafluorophosphate ($LiPF_6$), lithium fluoroborate ($LiBF_4$), lithium metaborate ($LiBO_2$), lithium perchlorate ($LiClO_4$) and lithium nitrate ($LiNO_3$), lithium bis(fluorosulfonyl) imide (LiFSI) and mixtures thereof.

LiTFSI is the preferred lithium salt.

The positive electrode of the invention may have a porosity less than or equal to about 40% by volume, and preferably less than or equal to about 30% by volume, in relation to the total volume of the electrode. This thus enables the energy density of the battery to be improved.

The second subject matter of the invention is a method for manufacturing a positive electrode as defined in the first subject matter of the invention, characterized in that it includes the following steps:

a) a step of mixing a composite material including sulfur (S) and carbon (C) and as defined in the first subject matter of the invention with at least one polymer binder $P_1$, at least one lithium salt $L_1$, at least one low-molar-mass liquid linear polyether, and optionally at least one solvent of said polymer binder $P_1$, for obtaining an electrode paste, b) a step of applying said electrode paste onto at least one support, c) a step of drying said electrode paste for obtaining a positive electrode in the form of a supported film.

The polymer binder $P_1$, lithium salt $L_1$ and low-molar-mass liquid linear polyether are as defined in the first subject matter of the invention.

Step a) may be performed by extrusion or milling.

Extrusion is very advantageous since it enables slightly porous electrodes to be easily obtained whilst using little solvent. It also avoids a step of calendering on the dry electrode which may cause changes in the structure of the electrode, impairing the correct coating of the grains of the carbon agent, and thus may lead to a collapse of the electrode during cycling. Finally, the step of calendering has the drawback of increasing the number of steps for obtaining the electrode, and thus its cost of production.

The solvent of the polymer binder $P_1$ of step a) is used to solubilize said polymer binder $P_1$.

When it is present, said solvent preferably represents less than about 30% by mass of the total mass of the mixture of composite material, of polymer binder $P_1$, lithium salt $L_1$ and polyether.

The use, during the manufacture of the positive electrode, of a small quantity of solvent of the polymer binder $P_1$ leads to a positive electrode of low porosity (i.e. about 40% by volume). This low porosity makes it possible to control and optimize the quantity of sulfur present in the positive electrode and thus to achieve optimal energy volume densities.

The solvent in step a) may be selected from water, N-methylpyrrolidone, carbonate solvents such as ethylene carbonate, propylene carbonate, dimethyl carbonate, diethyl carbonate or ethyl methyl carbonate, acetone, alcohols such as methanol, ethanol or propanol, and mixtures thereof.

Step b) may be performed by laminating or coating.

The support may be a current collector and/or a support film.

An example of a current collector might be an aluminum current collector covered with a carbon-based layer (anti-corrosion layer).

An example of a support film might be a plastic silicone-coated polyethylene terephthalate (PET) film.

The positive electrode supported film obtained at the end of step c) may have a thickness ranging from about 2 to 100 µm, and preferably from 10 to 60 µm.

Step c) may be performed at a temperature sufficient for removing the solvent of step a).

The third subject matter of the invention is a lithium-sulfur battery, characterized in that it includes:

a positive electrode as defined in the first subject matter of the invention or as manufactured in the second subject matter of the invention, a metallic negative electrode selected from lithium and a lithium alloy, a gelified polymer electrolyte including at least one low-molar-mass liquid linear polyether, at least one lithium salt $L_2$, and at least one polymer binder $P_2$.

The gelified polymer electrolyte may include about to 45% by mass of lithium salt $L_2$, and preferably about 30 to 45% by mass of lithium salt $L_2$, in relation to the total mass of the gelified polymer electrolyte.

The lithium salt $L_2$ may be selected from lithium fluorate ($LiFO_3$), lithium bis(trifluoromethanesulfonyl) imide (LiTFSI), lithium hexafluorophosphate ($LiPF_6$), lithium fluoroborate ($LiBF_4$), lithium metaborate ($LiBO_2$), lithium perchlorate ($LiClO_4$), lithium nitrate ($LiNO_3$), lithium bis(fluorosulfonyl) imide (LiFSI) and mixtures thereof.

LiTFSI is the preferred lithium salt.

The gelified polymer electrolyte may include about 3 to 20% by mass of polyether, and preferably about 3 to 10% by mass of polyether, in relation to the total mass of the gelified polymer electrolyte.

The low-molar-mass liquid linear polyether (i.e. polyether) is as defined in the first subject matter of the invention.

The polyether(s) used in the electrolyte of the battery of the invention are particularly stable vis-a-vis lithium and sulfur compounds, thereby minimizing side reactions.

In a preferred embodiment, the polyether is TEGDME.

The polymer binder $P_2$ may be selected from polyolefins such as ethylene and propylene homopolymers or copolymers, or a mixture of at least two of these polymers; homopolymers and copolymers of ethylene oxide (e.g. PEO, copolymer of PEO), methylene oxide, propylene oxide, epichlorohydrin, or allyl glycidyl ether, or mixtures thereof; halogenated polymers such as homopolymers and copolymers of vinyl chloride, vinylidene fluoride (PVDF), vinylidene chloride, ethylene tetrafluoride or chlorotrifluoroethylene, copolymers of vinylidene fluoride and hexafluoropropylene (PVDF-HFP) or mixtures thereof; anionic electronic non-conductive polymers such as polystyrene sulfonate, polyacrylic acid, polyglutamate, alginate, pectin, or mixtures thereof; polyacrylates; and one of the mixtures thereof.

The gelified polymer electrolyte may include about 40 to 80% by mass of polymer binder $P_2$, and preferably about 50 to 60% by mass of polymer binder $P_2$, in relation to the total mass of the gelified polymer electrolyte.

The inventors of the present patent application have discovered that the battery of the invention, although including a large quantity of sulfur in the positive electrode (i.e. at least 50% by mass of sulfur), does not see its capacity reduced from the first cycles as compared with batteries of the prior art, indicating that disconnection of the grains of active material is avoided during cycling.

The gelified polymer electrolyte used slows down the diffusion of polysulfides and thus stabilizes the battery capacity by limiting side reactions. Since the polyether of the electrolyte is in liquid form, this enables a larger quantity of lithium salt to be solubilized therein than with a solid polyether polymer. The significant presence of salt in the electrolyte slows down the diffusion of polysulfides therein. When the battery is in operation, a smaller quantity of active material thus leaves the positive electrode thanks to the use of such a gelified polymer electrolyte.

It should also be noted that the gelified polymer electrolyte allows the lithium ions to more easily reach the sulfur in the porosity of the carbon agent in comparison with a dry (i.e. solid) polymer electrolyte.

Finally, in comparison with a separator impregnated with liquid electrolyte, the gelified polymer electrolyte of the invention has a better resistance to dendrites and has the advantage of being self-supported.

The battery in conformity with the invention may operate between about 20 and 110° C., and preferably between about 60 and 100° C. Due to the gelified nature of the electrolyte, the operating temperature of the battery may also be slightly reduced compared to a solid electrolyte LMP (i.e. lithium metal polymer) battery, a reduction that further improves the cyclability of the battery.

The fourth subject matter of the invention is a method for manufacturing a lithium-sulfur battery as defined in the third subject matter of the invention, characterized in that it includes the following steps:

A) a step of preparing a gelified polymer electrolyte as defined in the third subject matter of the invention, notably by mixing at least one low-molar-mass liquid linear polyether, at least one lithium salt $L_2$ and at least one polymer binder $P_2$, then extruding the mixture to obtain an electrolyte paste, then laminating the electrolyte paste between two support films; and B) a step of assembling a positive electrode as defined in the first subject matter of the invention or as manufactured according to the method as defined in the second subject matter of the invention, a negative electrode and the gelified polymer electrolyte as obtained in the preceding step A).

The low-molar-mass liquid linear polyether, the lithium salt $L_2$ and the polymer binder $P_2$ are as defined in the third subject matter of the invention.

The two support films may be plastic films made of silicone-coated PET.

BRIEF DESCRIPTION OF THE DRAWINGS

FIGS. 1a-1b, 2a-2b, 3a-3b and 4a-4b respectively show composite materials A, B, 1 and 2 from example 1 through scanning electron microscopy (SEM). FIGS. 1b, 2b, 3b and 4b are enlargements of a part of FIGS. 1a, 2a, 3a and 4a respectively;

DETAILED DESCRIPTION

Figures 1A, 1B:
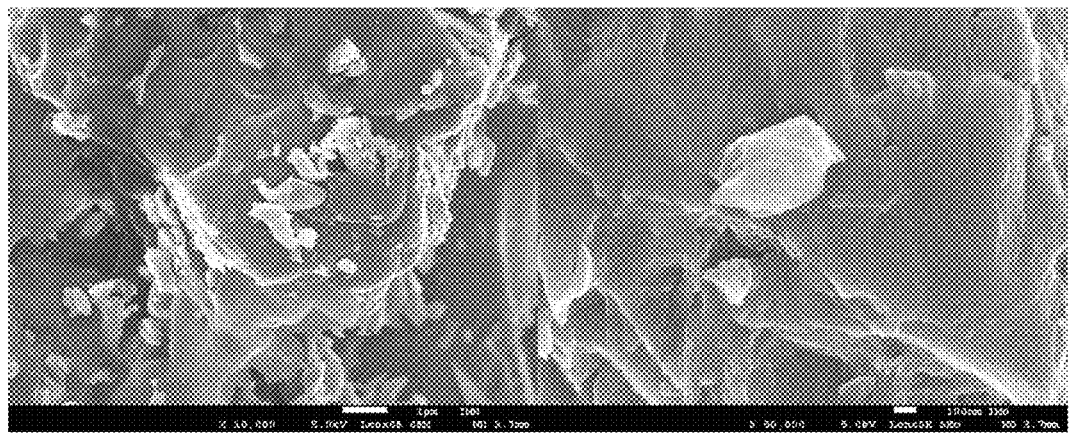
Figures 2A, 2B:
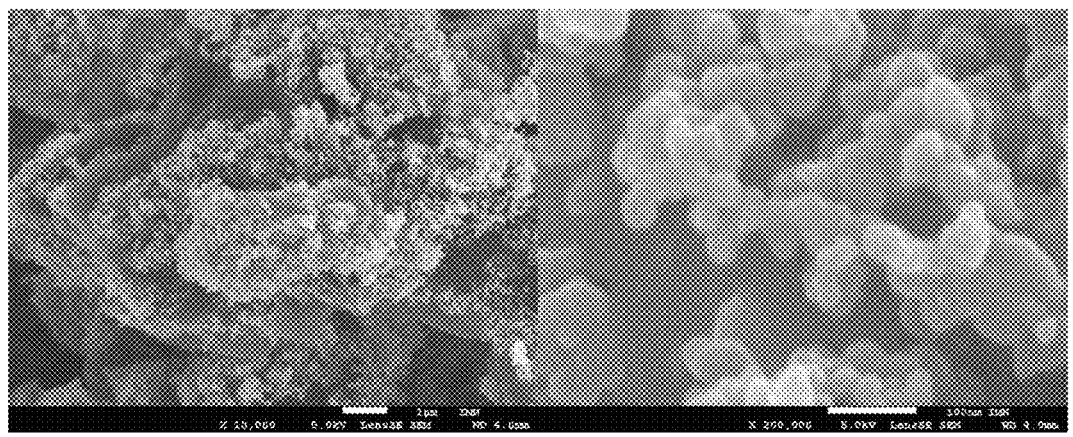

The present invention is illustrated by the examples below, to which it is, however, not limited.

EXAMPLES

The raw materials used in the examples are listed below:
"porous carbon" carbon black (BET specific surface area: 2 000 m$^2$/g), ACS Material,
"Specialty carbon black 5303", Asbury,
"ENSACO™ 350G Conductive Carbon Black", Timcal,
"Ketjenblack 600JD®" carbon black, AkzoNobel,
99.5% purity sulfur $S_8$, Sigma Aldrich,
"ZSN 8100" copolymer of PEO, Zeospan,
copolymer of poly(vinylidene difluoride-hexafluoropropylene) (PVDF-HFP), Solvay,
polyethyleneimine (PEI), 50% (weight/volume) in H$_2$O, Sigma Aldrich,
polyaniline in the form of Emeraldine salt (ES), Sigma Aldrich,
LiTFSI, 3M,
silicone-coated PET film, Mitsubishi.

Unless stated otherwise, all the materials were used as received from the suppliers.

Example 1

Preparation of a Plurality of Composite Materials A, B, 1 and 2

Four carbon/sulfur mixtures were prepared by mixing each of the ACS, Asbury, Timcal and Ketjenblack carbon blacks with sulfur $S_8$ in the following C/S mass proportions: 21.7/78.3 (with the ACS, Timcal and Ketjenblack carbon blacks) and 18.8/81.2 (with the Asbury carbon black).

The four C/S mixtures thus obtained were then milled in a mortar then stored in four closed containers.

The four containers each containing one of the different milled mixtures of carbon and sulfur were subjected to a heat treatment at a temperature of 155° C. for 2 hours.

The heat-treated mixtures were then milled in a mortar to obtain the following four composite materials:
A including ACS carbon black,
B including Asbury carbon black,
1 including Timcal carbon black and
2 including Ketjenblack carbon black.

Table 1 below displays the characteristics [specific surface area (in m$^2$/g), total pore volume (in cm$^3$/g), pore volume (in cm$^3$/g), average pore diameter (in nm)] of the different carbon blacks used for preparing the corresponding composite materials A, B, 1 and 2:

TABLE 1

| Carbon black | ACS | Asbury | Timcal | Ketjenblack |
| --- | --- | --- | --- | --- |
| Specific surface area (m$^2$/g) | 3802 (Langmuir) | 183 (BET) | 860 (BET) | 1529 (BET) |
| Total volume (cm$^3$/g) | 1.34 (<283 nm)$^a$ | 0.49 (<277 nm)$^a$ | 1.21 (<192 nm)$^a$ | 3.24 (<126 nm)$^a$ |
| BJH volume (cm$^3$/g) | ND | 0.30 | 0.96 | 2.84 |

TABLE 1-continued

| Carbon black | ACS | Asbury | Timcal | Ketjenblack |
|---|---|---|---|---|
| 2-50 nm Average pore diameter (BET) (nm) | 2.17 | 10.62 | 5.63 | 8.48 |
| Average pore diameter (BJH) (nm) | ND | 7.89 | 4.93 | 7.74 |
| Composite material obtained | A [*] | B [*] | 1 | 2 |

[*] Composite materials not forming part of the invention
[a] average maximum pore diameter taken into account for calculating the total volume.

The different carbon blacks tested in the different composite materials do not have the same characteristics (pore size, pore volume, porous surface, etc.) and therefore exhibit very different performances.

It should be noted that composite materials 1 and 2 are in conformity with the invention, whereas composite materials A and B do not form part of the invention since the ACS and Asbury carbon blacks from which composite materials A and B have been respectively obtained do not have the desired characteristics in terms of pore structure.

The specific surface area, total pore volume, BJH pore volume, average pore diameter of each of the ACS, Asbury, Timcal and Ketjenblack carbon blacks were evaluated with the aid of a device sold under the trade name ASAP2010, by Micromeritics.

FIGS. 1, 2, 3 and 4 respectively show composite materials A, B, 1 and 2 through scanning electron microscopy (SEM). FIGS. 1b, 2b, 3b and 4b are enlargements of a part of FIGS. 1a, 2a, 3a and 4a respectively.

The scanning electron microscopy (SEM) analysis was performed with the aid of an apparatus sold under the trade name JSM-7600F, by JEOL.

FIG. 1 shows that composite material A, not forming part of the invention and prepared from ACS carbon black, includes sulfur agglomerates. Indeed, ACS carbon black has an average pore size too small to enable the sulfur to be incorporated and homogeneously dispersed in the ACS carbon black. The presence of large agglomerates of sulfur causes the collapse of the positive electrode during cycling and does not achieve a good cyclability.

As indicated in the present invention, the pore size of the carbon must be sufficiently large (i.e. greater than 4 nm) to enable the molten sulfur to penetrate inside the pores, but sufficiently small (i.e. less than 10 nm) to exert sufficient retention of the polysulfides during cycling.

FIG. 2 shows that in composite material B, not forming part of the invention and prepared from Asbury carbon black, the sulfur seems better dispersed locally even if it is not present over the entire surface of the Asbury carbon black. Indeed, Asbury carbon black has an appropriate average pore size of about 9-10 nm, however the specific surface area of Asbury carbon black is not sufficient to enable the sulfur to be well distributed in the carbon porosity. Finally, its total pore volume is also not sufficiently high for all of the sulfur to be contained therein.

FIGS. 3 and 4 show that composite materials 1 and 2, forming part of the invention and prepared respectively from Timcal and Ketjenblack carbon blacks, have the same structure as the basic carbon blacks. A luster indicates the presence of sulfur. The sulfur, after this pretreatment, is homogeneously distributed around the carbon grains and does not form agglomerates outside them.

Figure 5:
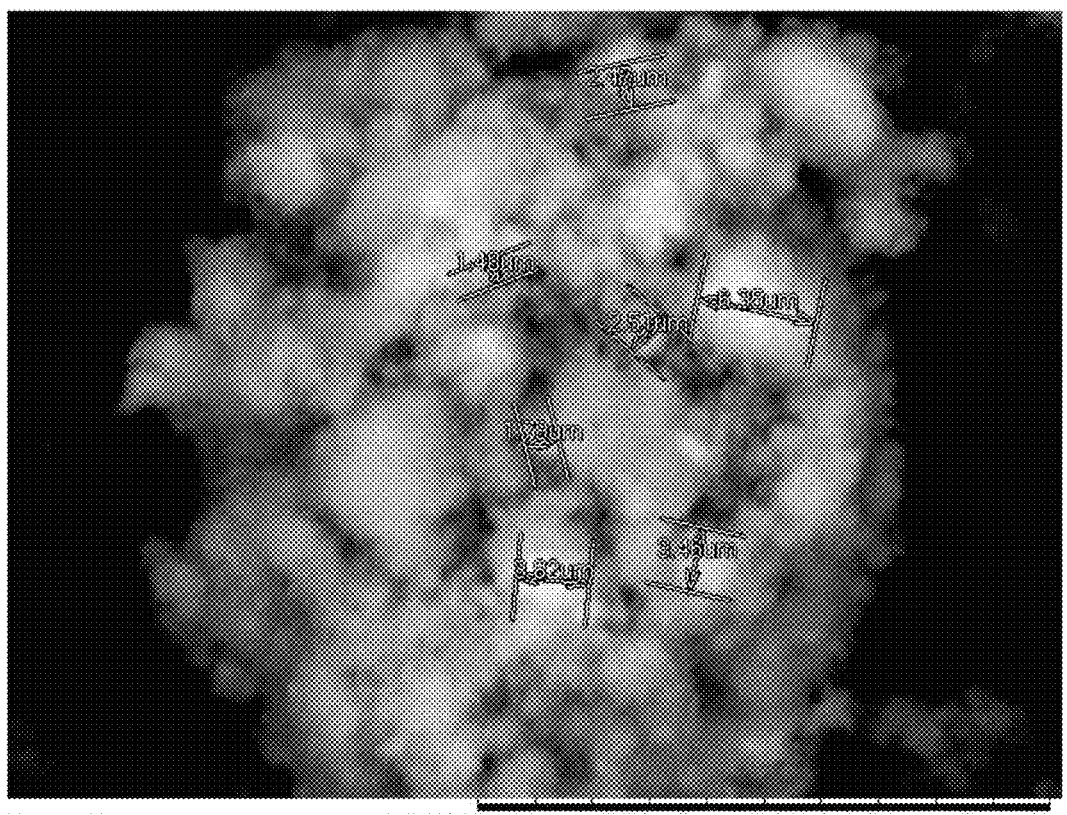
FIG. 5 is an image from Example 1 showing a mixture of Ketjenblack carbon black and elemental sulfur (mass proportions: 18.8% Ketjenblack carbon black and 81.2% elemental sulfur) by SEM after step ii) of milling and before step iii) of heat treatment.

As a comparison, FIG. 5 shows a mixture of Ketjenblack carbon black and elemental sulfur (mass proportions: 18.8% Ketjenblack carbon black and 81.2% elemental sulfur) by SEM after step ii) of milling and before step iii) of heat treatment. It is observed that the sulfur does not coat the carbon grains and is not homogeneously dispersed in the carbon agent.

Example 2

Preparation of a Plurality of Positive Electrodes E-A, E-B, E-1 and E-2

Each of the composite materials A, B, 1 and 2 obtained in Example 1 was mixed at 80° C. for 30 minutes with tetraethylene glycol dimethyl ether (TEGDME), Emeraldine in salt form (ES), a lithium salt (LiTFSI) and N-methylpyrrolidone (NMP) in a mixer sold under the trade name Plastograph® EC by Brabender®. The quantity of NMP used represented at most about 30% by mass of the total mass of the composite material, of TEGDME, ES and lithium salt.

Each of the pastes thus obtained was then laminated at 95° C. on an aluminum current collector covered with a carbon-based layer.

Each of the films thus obtained was dried at 105° C. for 30 minutes to obtain a positive electrode in film form in conformity with the invention.

Table 2 below sets out the mass composition of the four electrodes obtained:

TABLE 2

| Electrode | Carbon black (%) | Lithium salt (%) | TEGDME (%) | PANI (%) | S (%) |
|---|---|---|---|---|---|
| E-A[*] | 15.01 | 17.85 | 4.14 | 9.00 | 54.00 |
| E-B[*] | 12.48 | 19.96 | 4.63 | 9.00 | 53.93 |
| E-1 | 14.98 | 17.93 | 4.16 | 9.00 | 53.93 |
| E-2 | 15.00 | 17.85 | 4.15 | 9.00 | 54.00 |

[*] Electrode not forming part of the invention

Example 3

Manufacture of Batteries Including Positive Electrodes E-A, E-B, E-1 and E-2 a) Preparation of a Gelified Polymer Electrolyte EG in Conformity with the Invention Some lithium salt (LiTFSI) (39% by mass) was dissolved in the TEGDME (6% by mass) with magnetic stirring at 50° C. Then, a copolymer of Zeospan® PEO (20% by mass) and PVDF-HFP (35% by mass) were added to the mixture obtained. The resulting mixture was blended in the Plastograph® EC mixer as described in Example 2, at 130° C. for 1 hour. The electrolyte paste obtained was laminated at 125° C. between two silicone-coated PET plastic films.

b) Battery Assembly

Four batteries B-A, B-B, B-1 and B-2 were respectively prepared by assembling in an anhydrous atmosphere (air with a dew point <−40° C.) by laminating at 5 bar and at 80° C.:
  each of the four positive electrodes E-A, E-B, E-1 and E-2 obtained in Example 2,
  the gelified polymer electrolyte EG as obtained above in step a), and a negative electrode including lithium metal in the form of a film of lithium metal about 100 μm in thickness.

Table 3 below sets out the different batteries B-A, B-B, B-1 and B-2 manufactured respectively with positive electrodes E-A, E-B, E-1 and E-2 and the gelified polymer electrolyte EG:

TABLE 3

| Batteries | Positive electrode | Electrolyte | Comments |
|---|---|---|---|
| B-1 | E-1 | EG | Battery forming part of the invention |
| B-2 | E-2 | EG | Battery forming part of the invention |
| B-A(*) | E-A | EG | Battery not forming part of the invention: composite material not in conformity with the invention |
| B-B(*) | E-B | EG | Battery not forming part of the invention: composite material not in conformity with the invention |

(*)Battery not forming part of the invention

Figure 6:
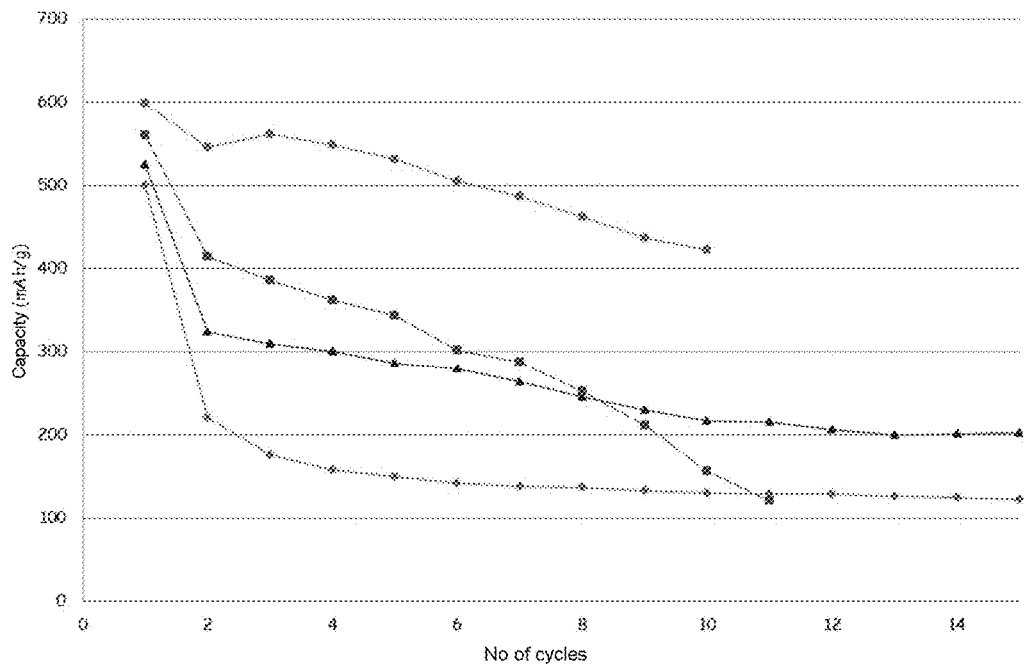
FIG. 6 is a graph of the measurements of specific capacities during discharge for batteries B-A, B-B, B-1 and B-2 from Example 3.

Measurements of specific capacities during discharge for batteries B-A, B-B, B-1 and B-2 are reported in FIG. 6, a figure in which the specific capacity (in mAh/g) is according to the number of cycles with a current regime of 2 lithiums in 10 h (~C/10). In this FIG. 6, the specific capacity measurements during discharge are made in relation to the mass of sulfur. According to FIG. 6, batteries B1 (curve with solid squares) and B-2 (curve with solid circles) forming part of the invention exhibit an initial specific capacity of about 550 to 600 mAh/g, while batteries B-A (curve with solid diamonds) and B-B (curve with solid triangles) not forming part of the invention exhibit a lower initial specific capacity of about 500 to 525 mAh/g. In addition, the cycling resistance of batteries B-A and B-B is very inadequate since the specific capacity decreases drastically after 2 cycles.

In particular, the specific capacity of battery B-2 is stable over at least 10 cycles.

These results show that the nature of the carbon agent (e.g. pore structure) used for preparing the composite material is important, in order to obtain a high initial specific capacity and good cyclability.

Example 4

Preparation of Two Positive Electrodes E-3 and E-4 in Conformity with the Invention A composite material 2' was prepared as in Example 1, but with a mixture of sulfur $S_8$ and Ketjenblack carbon black in C/S mass proportions: 18.8/81.2.

Each of the composite materials 2 (obtained in Example 1) and 2' (as defined above) was mixed at 80° C. for 30 minutes with TEGDME, PEI or PVDF-HFP, LiTFSI, water (for composite material 2) or NMP (for composite material 2') in the Plastograph® EC mixer as described in Example 2. The quantity of solvent (water or NMP) used represented at most about 30% by mass of the total mass of the composite material mixture, of TEGDME, PEI or PVDF-HFP, and LiTFSI.

Each of the pastes thus obtained was then laminated at 95° C. on an aluminum current collector covered with a carbon-based layer.

Each of the films thus obtained was dried at 105° C. for 30 minutes to obtain a positive electrode in film form in conformity with the invention.

Table 4 below sets out the mass composition of the two electrodes E-3 and E-4 forming part of the invention and obtained by the method described above:

TABLE 4

| Electrode | Carbon black (%) | LiTFSI (%) | TEGDME (%) | PVDF-HFP (%) | PEI (%) | S (%) |
|---|---|---|---|---|---|---|
| E-3 | 12.5 | 20 | 3 | 10 | 0 | 54 |
| E-4 | 15 | 3.9 | 15.1 | 0 | 12 | 54 |

Example 5

Preparation of Three Positive Electrodes E-C, E-D and E-E Not in Conformity with the Invention The positive electrode E-C was prepared by extruding a mixture of powders of composite material 2' obtained in Example 4, of lithium salt (LiTFSI) and copolymer of PEO, then by laminating the paste thus obtained at 95° C. on an aluminum current collector covered with a carbon-based layer. The paste was then dried at 105° C. for 30 minutes to obtain a positive electrode in film form not in conformity with the invention.

The positive electrode E-C does not form part of the invention since it does not contain any low-molar-mass liquid linear polyether as defined in the invention.

The positive electrode E-D was prepared by extruding a mixture of elemental sulfur Ss, Ketjenblack carbon black, lithium salt (LiTFSI) and low-molar-mass liquid linear polyether TEGDME, then by laminating the paste thus obtained at 95° C. on an aluminum current collector covered with a carbon-based layer. The paste was then dried at 105° C. for 30 minutes to obtain a positive electrode in film form not in conformity with the invention.

The positive electrode E-D does not form part of the invention since the mixture of sulfur agent and carbon agent did not undergo any pretreatment before the manufacture of the positive electrode.

The positive electrode E-E was prepared by extruding a mixture of elemental sulfur Ss, Ketjenblack carbon black, lithium salt (LiTFSI) and copolymer of PEO, then by laminating the paste thus obtained at 95° C. on an aluminum current collector covered with a carbon-based layer. The paste was then dried at 105° C. for 30 minutes to obtain a positive electrode in film form not in conformity with the invention.

The positive electrode E-E does not form part of the invention since it does not contain any low-molar-mass liquid linear polyether as defined in the invention and the mixture of sulfur agent and carbon agent did not undergo any pretreatment before the manufacture of the positive electrode.

Table 5 below sets out the mass composition of the three electrodes E-C, E-D, and E-E not forming part of the invention and obtained by the method described above:

TABLE 5

| Electrode | Carbon black (%) | LiTFSI (%) | Copolymer of PEO (%) | PVDF-HFP (%) | TEGDME (%) | S (%) |
|---|---|---|---|---|---|---|
| E-C(*) | 15 | 6 | 25 | 10 | 0 | 54 |
| E-D(*) | 7 | 17 | 0 | 20 | 3 | 54 |
| E-E(*) | 5 | 9 | 16 | 16 | 0 | 54 |

(*)Electrode not forming part of the invention

Example 6

Manufacture of Batteries Including Positive Electrodes E-C, E-D, E-E, E-3 and E-4 a) Preparation of a Gelified Polymer Electrolyte EG in Conformity with the Invention Some lithium salt (LiTFSI) (39% by mass) was dissolved in the TEGDME (6% by mass) with magnetic stirring at 50° C. Then, a copolymer of Zeospan® PEO (20% by mass) and PVDF-HFP (35% by mass) were added to the mixture obtained. The resulting mixture was blended in the Plastograph® EC mixer as described in Example 2, at 130° C. for 1 hour. The electrolyte paste obtained was laminated at 125° C. between two silicone-coated PET plastic films.

b) Preparation of a Gelified Polymer Electrolyte ES Not in Conformity with the Invention The solid polymer electrolyte was prepared by extruding a mixture of lithium salt (LiTFSI) (12% by mass), copolymer of Zeospan® PEO (48% by mass) and PVDF-HFP (40% by mass), then by laminating the electrolyte paste obtained at 125° C. between two plastic films of silicone-coated PET.

c) Battery Assembly

Five batteries B-C, B-D, B-E, B-3 and B-4 were prepared by assembling by laminating at 5 bar, at 80° C. and in an anhydrous atmosphere (air with a dew point <−40° C.):

- each of the five positive electrodes E-C, E-D, E-E, E-3 and E-4 obtained in Examples 4 and 5,
- one of the polymer electrolytes ES or EG as obtained in step a) or b) above, and
- a negative electrode including lithium metal.

Table 6 below sets out the different batteries B-C, B-D, B-E, B-3 and B-4 manufactured respectively with positive electrodes E-C, E-D, E-E, E-3 and E-4 and one of the gelified polymer electrolytes ES or EG:

TABLE 6

| Battery | Positive electrode | Electrolyte | Comments |
|---|---|---|---|
| B-3 | E-3 | EG | Battery forming part of the invention |
| B-4 | E-4 | EG | Battery forming part of the invention |
| B-C | E-C | ES | Battery not forming part of the invention: electrolyte and electrode not in conformity with the invention |
| B-D | E-D | EG | Battery not forming part of the invention: electrode not in conformity with the invention |
| B-E | E-E | ES | Battery not forming part of the invention: electrolyte and electrode not in conformity with the invention |

TABLE 6-continued

| Battery | Positive electrode | Electrolyte | Comments |
|---|---|---|---|

Figure 7:
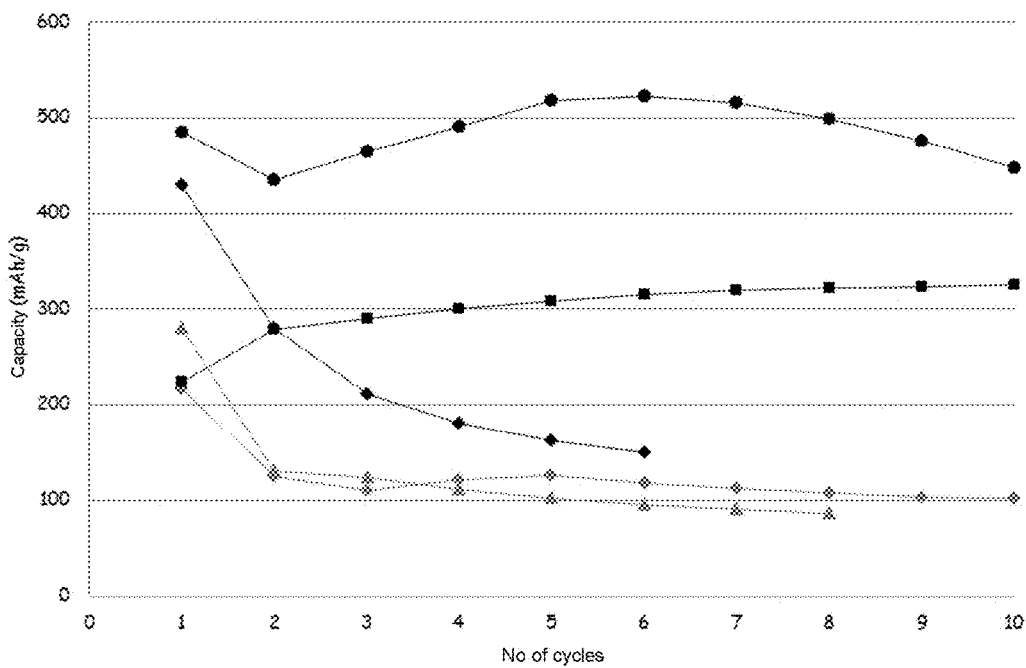
FIG. 7 is a graph of the measurements of specific capacities during discharge for batteries B-C, B-D, B-E, B-3 and B-4 from example 6.

Measurements of specific capacities during discharge for batteries B-C, B-D, B-E, B-3 and B-4 are reported in FIG. 7, a figure in which the specific capacity (in mAh/g) is according to the number of cycles with a current regime of 2 lithiums in 10 hours (~C/10). In this FIG. 7, the specific capacity measurements during discharge are made in relation to the mass of sulfur. According to FIG. 7, batteries E3 (curve with solid black squares) and E-4 (curve with solid black circles) forming part of the invention exhibit an initial specific capacity of about 210 and 490 mAh/g respectively, and batteries E-C (curve with solid gray triangles), E-D (curve with solid gray diamonds) and E-E (curve with solid black diamonds) not forming part of the invention exhibit an initial specific capacity of about 290, 210 and 425 mAh/g respectively. In addition, batteries B-C, B-D and B-E exhibit a very inadequate cycling resistance since the specific capacity decreases drastically after 2 cycles.

The specific capacity of batteries E-3 and E-4 is stable for at least 10 cycles.

These results show that the combination of pretreatment of the carbon agent and sulfur agent mixture and the use of the gelified polymer electrolyte makes it possible to obtain a clear improvement both in initial specific capacity and in cyclability.

Thus, a real synergy effect is observed between the positive electrode and electrolyte compositions, notably at 100° C. (operating temperature of the battery in the examples of the invention).

Indeed, when the gelified polymer electrolyte EG is replaced by a solid polymer electrolyte ES (battery B-C, curve with the solid gray triangles), the discharge capacity decreases after only a few cycles. Similarly, when the gelified polymer electrolyte EG is replaced by a solid polymer electrolyte ES and the pretreatment of the sulfur agent and carbon agent mixture is not performed (battery B-E, curve with solid black diamonds), the discharge capacity decreases drastically after only a few cycles. Likewise, the use of a gelified polymer electrolyte EG with a conventional positive electrode, i.e. without pretreatment of the sulfur agent and carbon agent mixture (battery B-D, curve with solid gray diamonds) gives similar results.

On the other hand, the use of a positive electrode and an electrolyte both in conformity with the invention (battery B-3, curve with solid black squares) reveals a stabilization and even a slight increase in capacity even after a larger number of cycles. Cyclability is therefore strongly improved thanks to the invention.

FIG. 7 also shows that the addition into the positive electrode of a conductive polymer such as PEI ensures a good cyclability of the battery while increasing the value of the initial discharge capacity (battery B-4, curve with solid black circles) by about 50%.

The invention claimed is:

1. Positive electrode comprising:
    at least one composite material including sulfur (S) and carbon (C), as an active electrode material,
    at least one polymer binder $P_1$,
    at least one low-molar-mass liquid linear polyether, and
    at least one lithium salt $L_1$, in that the sulfur (S) represents at least 40% by mass in relation to the total mass of said positive electrode, and in that the composite material including sulfur (S) and carbon (C) is obtained according to the following steps:

i) a step of mixing an essentially mesoporous carbon agent and a sulfur agent selected from elemental sulfur $S_8$ and an organic sulfur compound including at least one S—S bond, the quantity of sulfur (S) in said mixture ranging from 75% to 85% by mass, ii) a step of milling the mixture obtained in the preceding step i), iii) a step of heat treatment of the milled mixture obtained in the preceding step ii) in a closed container, at a temperature sufficient to melt the sulfur, iv) a step of milling the heat-treated mixture from the preceding step iii) so as to form said composite material, said carbon agent used in step i) exhibiting the following characteristics:

a specific surface area $S_{BET}$ greater than or equal to 700 m²/g, said specific surface area being calculated by the BET method, an average mesopore size between 4 and 10 nm, said size being calculated by a BJH method, and a total pore volume greater than or equal to 1 cm³/g, said total pore volume being calculated by a BET method, and wherein the positive electrode is obtained by mixing said composite material, said polymer binder $P_1$, said lithium salt $L_1$, and said low-molar-mass liquid linear polyether, so as to form an electrode paste.

2. Positive electrode according to claim 1, wherein the carbon agent is carbon black.

3. Positive electrode according to claim 1, wherein the temperature sufficient for the thermal treatment of step iii) ranges from 115° C. to 270° C.

4. Positive electrode according to claim 1, wherein step iii) is performed in a dry air atmosphere exhibiting a dew point less than or equal to −30° C.

5. Positive electrode according to claim 1, wherein said positive electrode includes 2 to 20% by mass of low-molar-mass liquid linear polyether, in relation to the total mass of the positive electrode.

6. Positive electrode according to claim 1, wherein the low-molar-mass liquid linear polyether is chosen from:

polyethylene glycols with the formula H—[O—CH$_2$—CH$_2$]$_m$—OH, in which m is between 1 and 13, glycol ethers with the formula R—[O—CH$_2$—CH$_2$]$_p$—O—R', in which p is between 1 and 13 and R and R', identical or different, are linear, substituted or cyclic alkyl groups, ethers with the formula $R^1$—[CH$_2$—O]$_q$—$R^{1'}$ in which q is between 1 and 13 and $R^1$ and $R^{1'}$, identical or different, are linear, substituted or cyclic alkyls, cyclic ethers, cyclic polyethers, and one of mixtures thereof.

7. Positive electrode according to claim 1, wherein the polyether is tetraethylene glycol dimethyl ether (TEGDME).

8. Positive electrode according to claim 1, wherein said positive electrode includes 5 to 20% by mass of polymer binder $P_1$, in relation to the total mass of the positive electrode.

9. Positive electrode according to claim 1, wherein said positive electrode includes 2 to 25% by mass of lithium salt $L_1$, in relation to the total mass of the positive electrode.

10. Positive electrode according to claim 1, wherein the polymer binder $P_1$ is polyethyleneimine (PEI) or polyaniline in the form of emeraldine salt (ES).

11. Method of manufacturing a positive electrode as defined in claim 1, said method comprising the steps of:

a) a step of mixing said composite material including sulfur (S) and carbon (C) and as defined in claim 1 with said at least one polymer binder $P_1$, said at least one lithium salt $L_1$, said at least one low-molar-mass liquid linear polyether, and optionally at least one solvent of said polymer binder $P_1$, for obtaining said electrode paste, b) a step of applying said electrode paste onto at least one support, c) a step of drying said electrode paste for obtaining a positive electrode in the form of a supported film.

12. Method according to claim 11, wherein said solvent represents less than 30% by mass of the total mass of the mixture of composite material, of polymer binder $P_1$, lithium salt $L_1$ and polyether.

13. Method according to claim 11, wherein step a) is performed by extrusion or by milling.

14. Lithium-sulfur battery, wherein said lithium-sulfur battery includes:

a positive electrode as defined in claim 1, a metallic negative electrode selected from lithium and a lithium alloy, a gelified polymer electrolyte including at least one low-molar-mass liquid linear polyether as defined in claim 6, at least one lithium salt $L_2$, and at least one polymer binder $P_2$.

15. Lithium-sulfur battery according to claim 14, wherein the gelified polymer electrolyte includes 20 to 45% by mass of lithium salt $L_2$, in relation to the total mass of the gelified polymer electrolyte.

16. Lithium-sulfur battery according to claim 14, wherein the lithium salt $L_2$ is selected from the group consisting of lithium fluorate (LiFO$_3$), lithium bis(trifluoromethanesulfonyl) imide (LiTFSI), lithium hexafluorophosphate (LiPF$_6$), lithium fluoroborate (LiBF$_4$), lithium metaborate (LiBO$_2$), lithium perchlorate (LiClO$_4$), lithium nitrate (LiNO$_3$), lithium bis(fluorosulfonyl) imide (LiFSI), and mixtures thereof.

17. Lithium-sulfur battery according to claim 14, wherein the gelified polymer electrolyte includes 3 to 20% by mass of polyether, in relation to the total mass of the gelified polymer electrolyte.

18. Lithium-sulfur battery according to claim 14, wherein the gelified polymer electrolyte includes 40 to 80% by mass of polymer binder $P_2$, in relation to the total mass of the gelified polymer electrolyte.

19. Lithium-sulfur battery according to claim 14, wherein the polymer binder $P_2$ is selected from the group consisting of polyolefins such as ethylene and propylene homopolymers or copolymers, or a mixture of at least two of these polymers; homopolymers and copolymers of ethylene oxide (e.g. PEO, copolymer of PEO), methylene oxide, propylene oxide, epichlorohydrin, or allyl glycidyl ether, or mixtures thereof; halogenated polymers such as homopolymers and copolymers of vinyl chloride, vinylidene fluoride (PVDF), vinylidene chloride, ethylene tetrafluoride or chlorotrifluoroethylene, copolymers of vinylidene fluoride and hexafluoropropylene (PVDF-HFP) or mixtures thereof; anionic electronic non-conductive polymers such as polystyrene sulfonate, polyacrylic acid, polyglutamate, alginate, pectin, or mixtures thereof; polyacrylates; and one of the mixtures thereof.

20. Method of manufacturing a lithium-sulfur battery as defined in claim 14, comprising the steps of:
 A) a step of preparing the gelified polymer electrolyte; and
 B) a step of assembling the positive electrode, a negative electrode and the gelified polymer electrolyte as obtained in the preceding step A).

* * * * *